US006265521B1

(12) United States Patent
Fyvie et al.

(10) Patent No.: US 6,265,521 B1
(45) Date of Patent: Jul. 24, 2001

(54) METHOD FOR PREPARING POLYETHER POLYMERS OF PREDETERMINED MOLECULAR

(75) Inventors: Thomas Joseph Fyvie; Peter David Phelps, both of Schenectady; Paul Edward Howson, Latham; Donald Frank Rohr, Rexford; Ganesh Kailasam, Clifton Park; Elliott West Shanklin, Altamont, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/632,675

(22) Filed: Aug. 7, 2000

(51) Int. Cl.[7] .......................... C08G 73/10; C08G 69/28; C08G 8/02
(52) U.S. Cl. .......................... 528/170; 528/125; 528/126; 528/128; 528/171; 528/172; 528/173; 528/174; 528/175; 528/179; 528/182; 528/183; 528/185; 528/188; 528/214; 528/215; 528/219; 528/220; 528/229; 528/351; 528/352; 528/353
(58) Field of Search ..................................... 528/170, 125, 528/126, 128, 171, 172, 173, 174, 175, 179, 182, 185, 188, 183, 214, 215, 219, 220, 229, 351, 352, 353

(56) References Cited

U.S. PATENT DOCUMENTS

| 3,787,364 | | 1/1974 | Wirth et al. ........................... 528/170 |
| 3,838,097 | | 9/1974 | Wirth et al. ........................... 528/170 |
| 3,847,869 | | 11/1974 | Williams ............................... 528/170 |
| 4,273,712 | | 6/1981 | Williams ............................... 548/461 |
| 5,229,482 | | 7/1993 | Brunelle .............................. 528/125 |
| 5,514,813 | * | 5/1996 | Brunelle .............................. 548/462 |
| 5,663,275 | * | 9/1997 | Schmidhauser ...................... 528/125 |
| 5,830,974 | | 11/1998 | Schmidhauser et al. ............ 528/125 |
| 5,856,421 | * | 1/1999 | Schmidhauser ...................... 528/170 |
| 5,908,915 | * | 6/1999 | Brunelle .............................. 528/170 |

* cited by examiner

Primary Examiner—P. Hampton-Hightower
(74) Attorney, Agent, or Firm—S. Bruce Brown; Noreen C. Johnson

(57) ABSTRACT

Polyether polymers such as polyetherimides are prepared by a two-step reaction. The first step is the reaction between an alkali metal salt of a dihydroxy-substituted aromatic hydrocarbon, such as bisphenol A disodium salt, and a substituted aromatic compound such as 1,3-bis[N-(4-chlorophthalimido)]benzene, the alkali metal salt being employed in an amount less than stoichiometric. The intermediate low molecular weight polymer thus produced then undergoes reaction with additional alkali metal salt. By this method, a polyether polymer of closely controlled molecular weight can be conveniently prepared.

21 Claims, No Drawings

METHOD FOR PREPARING POLYETHER POLYMERS OF PREDETERMINED MOLECULAR

BACKGROUND OF THE INVENTION

This invention relates to the preparation of polyether polymers, and more particularly to the preparation of polymers of closely controlled molecular weight by a simple and reliable method.

Various types of aromatic polyethers, including polyetherimides, polyethersulfones, polyetheretherketones, and polyetherketones, have become important as engineering resins by reason of their excellent properties. These polymers are typically prepared by the reaction of salts of dihydroxyaromatic compounds, such as bisphenol A disodium salt, with dihaloaromatic molecules such as bis(4-fluorophenyl) sulfone, bis(4-chlorophenyl) sulfone, the analogous ketones and bis(halophenyl)bisimides or bis(nitrophenyl)bisimides as illustrated by 1,3-bis[N-(4-chlorophthalimido)]benzene. Substantially equimolar proportions of the two reagents are normally required, with adjustment if desired for the presence of endcapping reagents such as 1-[N-(4-chlorophthalimido)]-3-(N-phthalimido)benzene.

According to U.S. Pat. No. 5,229,482, polyether polymers are prepared by the above-described reaction in a solvent of low polarity such as o-dichlorobenzene and in the presence of a catalytically active amount of a phase transfer catalyst which is substantially stable at the temperatures employed, such as a hexaalkylguanidinium halide. A similar method of preparation, employing a monoalkoxybenzene such as anisole as solvent, is described in U.S. Pat. No. 5,830,974.

One difficulty in the preparation of polyether polymers by this method is the preparation of polymers of controlled and desired molecular weights. Since very nearly equimolar proportions of the principal reagents are required in all instances, it is typically very difficult to predict or control the molecular weight of the polyether polymer. For example, polyetherimides having weight average molecular weights in the ranges of about 43,000–46,000 and about 50,000–55,000 may be desired by reason of their advantageous properties, but a given reaction may afford a product whose molecular weight is much higher or, more often, much lower. That product, being off specification, must be discarded, increasing the cost and size of the waste stream, with adverse consequences to the environment.

It is highly desirable, therefore, to develop a method for preparing polyether polymers which is adapted to the close control of molecular weight by relatively simple means.

SUMMARY OF THE INVENTION

The present invention is based on the discovery that it is possible to prepare an intermediate low molecular weight polyether polymer by withholding a portion of the dihydroxyaromatic compound salt in a first reaction step, and employing said intermediate polymer in a second step of reaction with further salt to produce a polymer of predetermined molecular weight. Further, the amount of further salt to be used in the second step can be determined from the molecular weight of the intermediate polymer.

In one embodiment the invention is a method for preparing a desired aromatic polyether polymer having a predetermined molecular weight which comprises:

(A) contacting, at a temperature and sufficiently dry state effective to promote a polymer-producing condensation reaction, at least one alkali metal salt of a dihydroxy-substituted aromatic hydrocarbon with at least one substituted aromatic compound of the formula $$Z(A^1-X^1)_2, \quad (I)$$

wherein Z is an activating radical, $A^1$ is an aromatic radical and $X^1$ is fluoro, chloro, bromo or nitro, the proportion of said alkali metal salt being less than the total amount calculated to produce said desired polymer, thereby producing an intermediate low molecular weight polymer;

(B) determining the molecular weight of said intermediate polymer; and (C) adding a further portion of at least one alkali metal salt, said further portion being calculated to produce said desired polymer and being in the range of about 0.2–8.0 mole percent of total alkali metal salt, and continuing said condensation reaction to produce said desired polymer.

DETAILED DESCRIPTION; PREFERRED EMBODIMENTS

At least one dihydroxy-substituted aromatic hydrocarbon is employed in the reaction. Suitable dihydroxy-substituted aromatic hydrocarbons include those having the formula $$HO-A^2-OH, \quad (II)$$

wherein $A^2$ is a divalent aromatic hydrocarbon radical. Suitable $A^2$ radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

The $A^2$ radical preferably has the formula $$-A^3-Y-A^4-, \quad (III)$$

wherein each of $A^3$ and $A^4$ is a monocyclic divalent aromatic hydrocarbon radical and Y is a bridging hydrocarbon radical in which one or two atoms separate $A^3$ from $A^4$. The free valence bonds in formula III are usually in the meta or para positions of $A^3$ and $A^4$ in relation to Y. Compounds in which $A^2$ has formula III are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula III, the $A^3$ and $A^4$ values may be unsubstituted phenylene or halo or hydrocarbon-substituted derivatives thereof, illustrative substituents (one or more) being alkyl, alkenyl, bromo, chloro. Unsubstituted phenylene radicals are preferred. Both $A^3$ and $A^4$ are preferably p-phenylene, although both may be o- or m-phenylene or one o- or m-phenylene and the other p-phenylene.

The bridging radical, Y, is one in which one or two atoms, preferably one, separate $A^3$ from $A^4$. Illustrative radicals of this type are methylene, cyclohexylmethylene, 2-[2.2.1]-bicycloheptylmethylene, ethylene, isopropylidene, neopentylidene, cyclohexylidene, cyclopentadecylidene, cyclododecylidene and adamantylidene; gem-alkylene (alkylidene) radicals are preferred. Also included, however, are unsaturated radicals.

Also included among suitable dihydroxy-substituted aromatic hydrocarbons are the 2,2,2',2'-tetrahydro-1,1'-spirobi[1H-indene]diols having formula IV:

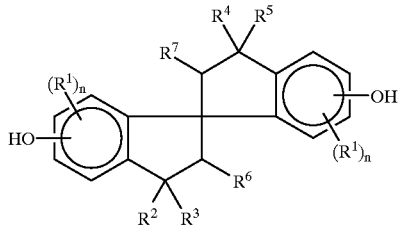

(IV)

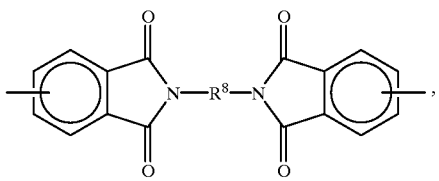

(V)

wherein each $R^1$ is independently selected from monovalent hydrocarbon radicals and halogen radicals; each $R^2$, $R^3$, $R^4$, and $R^5$ is independently $C_{1-6}$ alkyl; each $R^6$ and $R^7$ is independently H or $C_{1-6}$ alkyl; and each n is independently selected from positive integers having a value of from 0 to 3 inclusive. A preferred 2,2,2',2'-tetrahydro-1,1'-spirobi[1H-indene]-diol is 2,2,2',2'-tetrahydro-3,3,3',3'-tetramethyl-1,1'-spirobi[1H-indene]-6,6'-diol.

Some preferred examples of dihydric phenols of formula II include 6-hydroxy-1-(4'-hydroxyphenyl)-1,3,3-trimethylindane, 4,4'-(3,3,5-trimethylcyclo-hexylidene) diphenol; 1,1-bis(4-hydroxy-3-methylphenyl)cyclohexane; 2,2-bis(4-hydroxyphenyl)propane (commonly known as bisphenol-A); 2,2-bis(4-hydroxy-3,5-dimethylphenyl) propane; 2,2-bis(4-hydroxy-3-methylphenyl)propane; 2,2-bis(4hydroxy- 3-ethylphenyl)propane; 2,2-bis(4-hydroxy-3-isopropylphenyl)propane; 2,4'-dihyroxydiphenylmethane; bis(2-hydroxyphenyl)methane; bis(4-hydroxy-phenyl) methane; bis(4-hydroxy-5-nitrophenyl)methane; bis(4-hydroxy-2,6-dimethyl-3-methoxyphenyl)methane; 1,1-bis (4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl)cyclohexylmethane; 2,2-bis (4-hydroxyphenyl)-1-phenylpropane; resorcinol; $C_{1-3}$ alkyl-substituted resorcinols. For reasons of availability and particular suitability for the purposes of this invention, the preferred dihydric phenol is bisphenol A in which the radical of formula III is the 2,2-bis(4-phenylene)propane radical and in which Y is isopropylidene and $A^3$ and $A^4$ are each p-phenylene.

The alkali metal salts of dihydroxy-substituted aromatic hydrocarbons which are employed in the present invention are typically sodium or potassium salts. Sodium salts are frequently preferred by reason of their availability and relatively low cost.

The substituted aromatic compounds useful in the invention comprise at least one compound of formula I, and contain an aromatic radical $A^1$ and an activating radical Z. The $A^1$ radical is normally a di- or polyvalent $C_{6-10}$ radical, preferably monocyclic and preferably free from electron-withdrawing substituents other than Z. Unsubstituted $C_6$ aromatic radicals are especially preferred.

The radical Z is one which activates a leaving group X on an aromatic radical for displacement by alkali metal salts of dihydroxy-substituted aromatic hydrocarbons. The Z radical is usually an electron-withdrawing group, which may be di- or polyvalent to correspond with the valence of $A^1$. Illustrative examples of divalent radicals include carbonyl, carbonylbis(arylene), sulfone, bis(arylene)sulfone, benzo-1, 2-diazine and azoxy. Illustrative examples of the moiety —$A^1$—Z—$A^1$— include bis(arylene) sulfone, bis(arylene) ketone, tris(arylene)bis(sulfone), tris(arylene)bis(ketone), bis(arylene)benzo-1,2-diazine or bis(arylene)azoxy radical and especially those in which $A^1$ is p-phenylene.

Also included are compounds in which —$A^1$—Z—$A^1$— is a bis(ether imide) radical, illustrated by those of the formula wherein $R^8$ is a substituted or unsubstituted $C_{6-20}$ divalent aromatic hydrocarbon radical, a $C_{2-22}$ alkylene or cycloalkylene radical, or a $C_{2-8}$ bis(alkylene-terminated) polydiorganosiloxane radical In one embodiment of the invention $R^8$ is derived from a diamine selected from the group consisting of aliphatic, aromatic, and heterocyclic diamines. Exemplary aliphatic moieties include, but are not limited to, straight-chain-, branched-, and cycloalkyl radicals, and their substituted derivatives. Straight-chain and branched alkyl radicals are typically those containing from 2 to 22 carbon atoms, and include as illustrative non-limiting examples ethyl, propyl, butyl, neopentyl, hexyl, dodecyl. Cycloalkyl radicals are typically those containing from 3 to 12 ring carbon atoms. Some illustrative non-limiting examples of cycloalkyl radicals include cyclobutyl, cyclopentyl, cyclohexyl, methylcyclohexyl, and cycloheptyl.

The two amino groups in diamine-derived aliphatic moieties are preferably each separated from each other by at least two and most preferably by at least three carbon atoms. In especially preferred embodiments for diamines, the two amino groups are in the alpha, omega positions of a straight-chain or branched alkyl radical, or their substituted derivatives; or in the 1,4-positions of a cycloalkyl radical or its substituted derivatives. Preferred substituents for said aliphatic moieties include one or more halogen groups, preferably fluoro, chloro, or bromo, or mixtures thereof; or one or more aryl groups, preferably phenyl groups, alkyl- or halogen-substituted phenyl groups, or mixtures thereof. Most preferably substituents for aliphatic moieties, when present, are chloro or unsubstituted phenyl.

Aromatic moieties suitable for $R^8$ in formula V include, but are not limited to, monocyclic, polycyclic and fused aromatic compounds having from 6 to 20, and preferably from 6 to 18 ring carbon atoms, and their substituted derivatives. Polycyclic aromatic moieties may be directly linked (such as, for example, biphenyl) or may be separated by 1 or 2 atoms comprising linking moieties as in formula VI

(VI)

in which Q is

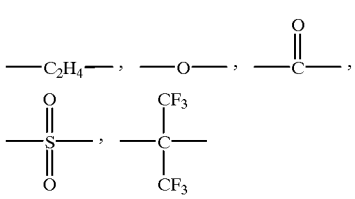

or a covalent bond. Representative linking moieties may also include phosphoryl, S, and $C_{1-6}$ aliphatic, such as isopropylidene and methylene. Illustrative non-limiting examples of aromatic moieties include phenyl, biphenyl, naphthyl, bis(phenyl)methane, bis(phenyl)-2,2-propane, and their substituted derivatives. Preferred substituents include one or more halogen groups, preferably fluoro, chloro, or bromo, or mixtures thereof; or one or more straight-chain-, branched-, or cycloalkyl groups having from 1 to 22 carbon atoms, preferably methyl, ethyl, propyl, isopropyl, tert-butyl, or mixtures thereof. Most preferably, substituents for aromatic moieties, when present, are at least one of chloro, methyl, ethyl or mixtures thereof.

The two amino groups in diamine-derived aromatic moieties are preferably separated by at least two and most preferably by at least three ring carbon atoms. When the amino group or groups are located in different aromatic rings of a polycyclic aromatic moiety, they are preferably separated from the direct linkage or from the linking moiety between any two aromatic rings by at least two and most preferably by at least three ring carbon atoms. Especially preferred diamines for the embodiments of the present invention include meta-phenylenediamine; para-phenylenediamine; mixtures of meta- and para-phenylenediamine; isomeric 2-methyl- and 5 -methyl-4,6-diethyl-1,3-phenylenediamines or their mixtures; bis(4-diaminophenyl)-2,2-propane; and bis(2-chloro-4-amino-3, 5-diethylphenyl)methane.

Heterocyclic moieties suitable for $R^8$ in formula V include, but are not limited to, monocyclic, polycyclic and fused heterocyclic compounds having from 3 to 30, preferably from 5 to 13 ring carbon atoms, and 1 to 4 ring heteroatoms. The ring heteroatoms include, but are not limited to, oxygen, nitrogen, sulfur, or combinations thereof. Preferably, ring heteroatoms are nitrogen. Polycyclic heterocyclic moieties may be directly linked (such as, for example, bipyridyl) or may be separated by 1 or 2 atoms comprising linking moieties. Representative linking moieties include, but are not limited to, carbonyl, phosphoryl, O, S, $SO_2$, $C_{1-6}$ aliphatic, such as isopropylidene and methylene.

The two amino groups in diamine-derived heterocyclic moieties are preferably separated by at least two and most preferably by at least three ring atoms. When the amino group or groups are located in different heterocyclic rings of a polycyclic heterocyclic moiety, they are preferably separated from the direct linkage or from the linking moiety between any two heterocyclic rings by at least two and most preferably by at least three ring atoms. Exemplary heterocyclic moieties include, but are not limited to, furyl, pyridyl, bipyridyl, pyrryl, pyrazinyl, pyrimidyl, pyrazolyl, thiazyl, thienyl, bithienyl, and quinolyl.

Most often, $R^8$ is at least one of m-phenylene, p-phenylene, 4,4'-oxybis(phenylene) or

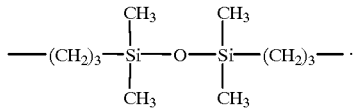

(VII)

Polyvalent Z radicals include those in which Z together with $A^1$ form part of a fused ring system such as benzimidazole, benzoxazole, quinoxaline or benzofuran.

Also present in the substituted aromatic compound of formula I are two displaceable $X^1$ radicals which may be fluoro, chloro, bromo or nitro. In most instances, fluoro and chloro atoms are preferred by reason of the relative availability and effectiveness of the compounds containing them.

Among the particularly preferred substituted aromatic compounds of formula I are bis(4-fluorophenyl) sulfone and the corresponding chloro compound, bis(4-fluorophenyl) ketone and the corresponding chloro compound, and 1,3- and 1,4-bis[N-(4-fluorophthalimido)]benzene and 1,3- and 1,4-bis[N-(3-fluorophthalimido)]-benzene; and 4,4'-bis[N-(4-fluorophthalimido)]phenyl ether and 4,4'-bis[N-(3-fluorophthalimido)]phenyl ether; and the corresponding chloro, bromo and nitro compounds. The bis(phthalimido) compounds are the most preferred, since the method of the invention has been found particularly useful for the production of polyetherimides. Mixtures of such compounds may also be employed. Especially preferred substituted aromatic compounds of formula I include at least one of 1,3-bis[N-(4-chlorophthalimido)]benzene, 1,4-bis[N-(4-chlorophthalimido)]benzene, 1,3-bis[N-(3-chlorophthalimido)]benzene, 1,4-bis[N-(3-chlorophthalimido)]benzene, 1-[N-(4-chlorophthalimido)]-3-[N-(3-chlorophthalimido)benzene, or 1-[N-(4-chlorophthalimido)]-4-[N-(3-chlorophthalimido)]benzene.

A third material most often employed in embodiments of the present invention is at least one solvent. Preferred solvents have a boiling point above about 150° C., in order to facilitate the reaction which requires temperatures in the range of about 125–250° C. Additionally, the reaction is typically sensitive to water and it is preferable to dry the solvent-comprising reaction mixture by known methods, for example by boiling or azeotroping water from the mixture, typically prior to delivering the catalyst. In one embodiment water removal from the system can be accomplished in either batch, semi-continuous or continuous processes using means well-known in the art such as a distillation column in conjunction with one or more reactors. In a particular embodiment, a mixture of water and non-polar organic liquid distilling from a reactor is sent to a distillation column where water is taken off overhead and solvent is recycled back into the reactor at a rate to maintain or increase the desired solids concentration. Other methods for water removal include, but are not limited to, passing the condensed distillate through a drying bed for chemical or physical adsorption of water.

In a preferred embodiment bisphenol A disodium salt is added to the organic solvent and the mixture azeotroped to a dry condition. Then, a second co-monomer, for example a bis[N-(chlorophthalimido)]benzene, may be added and the mixture azeotroped to a dry condition. Then a catalyst may be added as a pre-dried solution in organic solvent. The process is expedited when predried solvent and co-monomers are used.

In preferred embodiments a reaction mixture is essentially dry, which in the present context means that a mixture contains less than about 100 ppm water, preferably less than about 50 ppm water, more preferably less than about 25 ppm water, and most preferably less than about 10 ppm water as measured by Karl Fisher titration. A sufficiently dry state in the present context means that a reaction mixture is essentially dry.

One class of preferred solvents includes those of low polarity. Suitable solvents of this type include halogenated aromatic compounds such as o-dichlorobenzene, dichlorotoluene and 1,2,4-trichlorobenzene; and diphenyl sulfone. Solvents of similar polarity but lower boiling points, such as chlorobenzene, may be employed at superatmospheric pressures. Another class of preferred solvents includes aromatic ethers such as diphenyl ether, phenetole (ethoxybenzene), and anisole (methoxybenzene). Alkoxybenzenes, most preferably anisole, are particularly preferred. In many instances, halogenated aromatic solvents are preferred over alkoxybenzenes since the former have less tendency than the latter to interact with and inactivate the phase transfer catalyst described below. Another class of solvents suitable for the present invention is polar aprotic solvents, illustrative examples of which include dimethylformamide (DMF), dimethylacetamide (DMAc), dimethylsulfoxide (DMSO), and N-methylpyrrolidinone (NMP).

Also preferably present in embodiments of the invention is a phase transfer catalyst which is substantially stable at temperatures in the range of about 125–250° C. Various types of phase transfer catalysts may be employed for this purpose. They include quaternary phosphonium salts of the type disclosed in U.S. Pat. No. 4,273,712, N-alkyl-4-dialkylaminopyridinium salts of the type disclosed in U.S. Pat. Nos. 4,460,778 and 4,595,760, and guanidinium salts of the type disclosed in the aforementioned U.S. Pat. No. 5,229,482. Said patents are incorporated by reference herein.

The preferred phase transfer catalysts, by reason of their exceptional stability at high temperatures and their effectiveness to produce high molecular weight aromatic polyether polymers in high yield are the hexaalkylguanidinium and α,ω-bis(pentaalkylguanidinium)alkane salts. For the sake of brevity, both types of salts are hereinafter sometimes designated "guanidinium salt".

Suitable guanidinium salts are illustrated by those of the formula

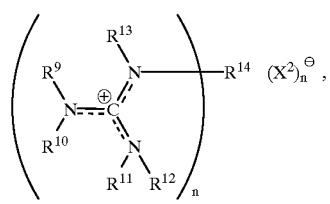

(VIII)

wherein:
each of $R^9$, $R^{10}$, $R^{11}$, $R^{12}$ and $R^{13}$ is a primary alkyl radical and $R^{14}$ is a primary alkyl or bis(primary alkylene) radical, or at least one of the $R^9$—$R^{10}$, $R^{11}$—$R^{12}$ and $R^{13}$—$R^{14}$ combinations with the connecting nitrogen atom forms a heterocyclic radical;
$X^2$ is an anion; and
n is 1 or 2.

The alkyl radicals suitable as $R^{9-13}$ include primary alkyl radicals, generally containing about 1–12 carbon atoms. $R^{14}$ is usually an alkyl radical of the same structure as $R^{9-13}$ or a $C_{2-12}$ alkylene radical in which the terminal carbons are primary; most preferably, it is $C_{2-6}$ alkyl or $C_{4-8}$ straight chain alkylene. Alternatively, any combination of $R^{9-14}$ and the corresponding nitrogen atom(s) may form a heterocyclic radical such as piperidino, pyrrolo or morpholino.

The $X^2$ value may be any anion and is preferably an anion of a strong acid; examples are chloride, bromide and methanesulfonate. Chloride and bromide ions are usually preferred. The value of n will be 1 or 2 depending on whether $R^{14}$ is alkyl or alkylene.

As indicated by the dotted bonds in formula VIII, the positive charge in the guanidinium salt is delocalized over one carbon and three nitrogen atoms. This is believed to contribute to the salts' stability under the relatively high temperature conditions encountered in embodiments of the invention.

In an embodiment of the present invention, step A comprises bringing into contact at least one bisphenol salt and at least one substituted aromatic compound using an amount of bisphenol salt which is less than equimolar. Thus, there is produced an intermediate low molecular weight polymer, typically having a weight average molecular weight in the range of about 10,000–40,000, preferably about 20,000–40,000, and more preferably about 30,000–40,000. It is also within the scope of the invention to employ monofunctional reagents such as monohydroxyaromatic compounds or monohalo- or nitroaromatic compounds as chain termination agents, as illustrated by the aforementioned 1-[N-(4-chlorophthalimido)]-3-(N-phthalimido)benzene in the case of a polyetherimide.

The amount of the deficiency of bisphenol salt employed in step A will vary according to the desired final molecular weight of the product. Most often, about 92–99.8 mole percent, preferably about 95–99.5 mole percent, and more preferably about 97–99.5 mole percent of the stoichiometric amount is employed in this step.

Reaction temperatures are those effective to promote a polymer-producing condensation reaction, generally in the range of about 125–250° C. and preferably about 130–225° C. The proportion of phase transfer catalyst employed is generally about 0.5–10 and preferably about 1–5 mole percent based on total bisphenol salt.

Step B comprises determining the molecular weight of the intermediate polymer produced in step A. Most often, the weight average molecular weight is the one determined. This determination may be made by removing a sample of the intermediate polymer and subjecting it to an art-recognized molecular weight determination method such as gel permeation chromatography, which is generally the preferred method. Alternatively, an online (in situ) method of molecular weight determination such as light scattering or indirect measurements such as intrinsic viscosity may be employed. When indirect measurement is used, the resulting data may be correlated using a calibration curve to determine molecular weight.

Step C comprises the addition of further at least one bisphenol salt, to a total at or near the stoichiometric amount. A bisphenol salt added at this point may be the same as or different than a bisphenol salt initially added. The amount of bisphenol salt to be added in step C is in the range of between about 0.2 and about 8.0 mole percent, preferably between about 0.5 and about 5.0 mole percent, and more preferably between about 0.5 and about 3.0 mole percent of the total amount employed; its exact level will depend on the molecular weight of the intermediate polymer, as determined in step B, and the desired molecular weight of the final polymer, and can be determined by simple experimentation. Additionally, it is preferable to keep the reaction mixture essentially dry during step C. Typically the reaction is run under a dry inert gas, such as nitrogen or argon, for example as a blanket or sparge. In the event that the reaction becomes water contaminated, further azeotroping to a desired level of dryness is preferred after which additional monomer can be added and another aliquot of catalyst can be added if so desired.

Temperatures and other conditions employed in step C are generally the same as in step A. It is not usually necessary to introduce additional phase transfer catalyst, but, if a decreased reaction rate suggesting catalyst inactivation is noted, it may be desirable to do so, usually to a total catalyst level for steps A and B combined which is not greater than about 7 and preferably not greater than about 5 mole percent based on total bisphenol salt.

Following completion of the reaction, the aromatic polyether polymer may be isolated by conventional methods.

This typically includes the steps of washing and precipitation by combination of the polymer solution with a non-solvent for the polymer.

The invention is illustrated by the following non-limiting examples. Molecular weights were determined by gel permeation chromatography (GPC) using a Hewlett Packard 1090 Liquid Chromatograph. Samples were eluted with chloroform at 1 milliliter per minute at 40° C. through four Waters Ultrastyragel GPC columns. The instrument was calibrated with polystyrene standards.

EXAMPLE 1

Bisphenol A disodium salt, 1,949.2 grams (g) (7.166 moles), was dried and added to a 38 liter reactor as a salt slurry in anisole and the mass of salt was determined by sampling and titrating to a colorometric end point. Dry anisole was added and distilled to remove residual water from the system. 1,3-Bis[N-(4-chlorophthalimido)]benzene, 3,084.8 g (7.059 moles), and 77.8 g (0.1935 moles) of endcapping reagent 1-[N-(4-chlorophthalimido)]-3-(N-phthalimido)benzene were added to the reactor as dry powders and further drying was accomplished by solvent distillation.

When the reaction mixture was essentially dry, 33.1 g (125.4 millimoles [mmol]) of hexaethylguanidinium chloride was added as a dry solution in anisole. The reaction was allowed to proceed in refluxing anisole at 156° C. for 2 hours. The weight and number average molecular weights of the resulting intermediate product were 28,384 and 13,734, respectively. Additional dry bisphenol A disodium salt, 58.1 g (214 mmol), was added and the reaction was continued under the same conditions. After a total reaction time (for steps A and B) of 6 hours, the weight and number average molecular weights of the polyetherimide product were 52,665 and 24,660, respectively.

EXAMPLE 2

Bisphenol A disodium salt, 1,867 g (6.864 moles), was dried and added to a 38 liter reactor as a salt slurry in anisole and the mass of salt was determined by sampling and titrating to a colorometric end point. Dry anisole was added and distilled to remove residual water from the system. 1,3-Bis[N-(4-chlorophthalimido)]benzene, 2,954.6 g (6.761 moles), and 74.5 g (185.4 mmol ) of endcapping reagent 1-[N-(4 -chlorophthalimido)]-3-(N-phthalimido)benzene were added to the reactor as dry powders and further drying was accomplished by solvent distillation.

When the reaction mixture was essentially dry, 31.7 g (120.1 mmol) of hexaethylguanidinium chloride was added as a dry solution in anisole. The reaction was allowed to proceed in refluxing anisole at 156° C. for 2 hours. The weight and number average molecular weights of the resulting intermediate product were 39,006 and 18,574, respectively.

Additional dry bisphenol A disodium salt, 20.4 g (74.9 mmol), was added and the reaction was continued under the same conditions. After a total reaction time (for steps A and B) of 4 hours, the weight and number average molecular weights of the polyetherimide product were 51,583 and 24,447, respectively.

EXAMPLE 3

Bisphenol A disodium salt, 588.9 g (2.165 moles ), was added to a 38 liter reactor as a solid. Dry anisole was added and distilled to remove residual water from the system. 1,3-Bis[N-(4-chlorophthalimido)]benzene, 950.9 g (2.176 moles), was added to the reactor as a dry powder and further drying was accomplished by solvent distillation.

When the reaction mixture was essentially dry, 19.8 g (75 mmol) of hexaethylguanidinium chloride was added as a dry solution in anisole. The reaction was allowed to proceed in refluxing anisole at 156° C. for 2 hours. The weight and number average molecular weights of the resulting intermediate product were 30,600 and 14,571, respectively.

Additional dry bisphenol A disodium salt, 20.6 g (75.7 mmol), and hexaethylguanidinium chloride, 9.9 g (37 mmol), were added and the reaction was continued under the same conditions. After a total reaction time (for steps A and B) of 10.5 hours the weight and number average molecular weights of the polyetherimide product were 48,200 and 22,952, respectively.

EXAMPLE 4

A 22 liter flask equipped with a mechanical stirrer and a reflux condenser was charged with 11 liters of a commercially prepared slurry in toluene of bisphenol A disodium salt (approx. 25% by weight). The flask was heated in a mantle and 2 liters of toluene was distilled off. o-Dichlorobenzene was then added to the flask to maintain a constant level at about 11.5 liters and distillation was continued until the pot temperature was maintained at 180.5° C. for 15 minutes. A total of 10 liters of distillate was removed. The flask was cooled overnight under positive pressure of dry nitrogen.

The slurry was stirred and sampled by suction into a 250 milliliter plastic bottle. The sample (72.957 g) was dissolved by addition of methanol (94.60 g). Aliquots of the dissolved slurry were titrated with 0.989 M aqueous hydrochloric acid solution to a cresol red end point. The amount of bisphenol salt in the slurry was determined to be 18.765% by weight.

A 38 liter stainless steel reactor was charged with 2,956 g (6.760 moles) of dry solid 1,3-bis[N-(4-chlorophthalimido)]benzene and 21 liters of o-dichlorobenzene. The reactor was heated and 2.8 liters of o-dichlorobenzene removed overhead to dry the reagent. The bisphenol salt slurry (9.76 kg, 1.831 kg salt, 6.726 moles) was pumped into the reactor using a peristaltic pump. The reaction vessel was then charged with 45.6 g (177 mmol) of 1-[N-(4-chlorophthalimido)]-3-(N-phthalimido)benzene and finally with 32.72 g (124 mmol) of hexaethylguanidinium chloride as a dry solution in o-dichlorobenzene. After 1.5 hours at 180° C., the weight and number average molecular weights of the polymer increased to 40,200 and 19,142, respectively.

The intermediate polymer thus obtained was treated at 2.25 hours with 115 g (79.3 mmol) of bisphenol A disodium salt slurry. After 3 hours at 180° C., the weight and number average molecular weights had built to 53,400 and 24,660, respectively.

The reaction mixture was allowed to cool overnight to 50° C. Anhydrous hydrogen chloride gas (8.0 g, 219 mmol) was added over 5 minutes through a dip tube and the mixture was allowed to stir for an additional hour before being transferred into containers for storage and subsequent washing.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A method for preparing a desired aromatic polyether polymer having a predetermined molecular weight which comprises:

(A) contacting, at a temperature and sufficiently dry state effective to promote a polymer-producing condensation reaction, at least one alkali metal salt of a dihydroxy-substituted aromatic hydrocarbon with at least one substituted aromatic compound of the formula $$Z(A^1-X^1)_2, \qquad (I)$$

wherein Z is an activating radical, $A^1$ is an aromatic radical and $X^1$ is fluoro, chloro, bromo or nitro, the proportion of said alkali metal salt being less than the total amount calculated to produce said desired polymer, thereby producing an intermediate low molecular weight polymer;

(B) determining the molecular weight of said intermediate polymer; and (C) adding a further portion of at least one alkali metal salt, said further portion being calculated to produce said desired polymer and being in the range of between about 0.2 and about 8.0 mole percent of total alkali metal salt, and continuing said condensation reaction to produce said desired polymer.

2. The method according to claim 1 wherein the further portion of at least one alkali metal salt is in the range of between about 0.5 and about 5.0 mole percent of total alkali metal salt.

3. The method according to claim 1 wherein the further portion of at least one alkali metal salt is in the range of between about 0.5 and about 3.0 mole percent of total alkali metal salt.

4. The method according to claim 1 wherein —$A^1$—Z—$A^1$— is a bis(ether imide) radical, illustrated by those of the formula

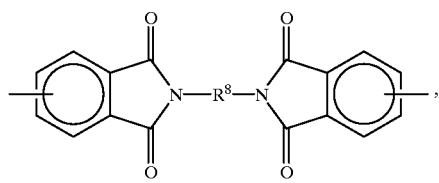
(V)

wherein $R^8$ is a substituted or unsubstituted $C_{6-20}$ divalent aromatic hydrocarbon radical, a $C_{2-20}$ alkylene or cycloalkylene radical, a $C_{2-8}$ bis(alkylene-terminated) polydiorganosiloxane radical or a divalent radical of the formula

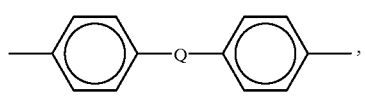
(VI)

in which Q is isopropylidene, methylene,

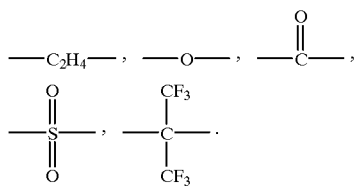

or a covalent bond.

5. A method according to claim 4 wherein the substituted aromatic compound is at least one member selected from the group consisting of 1,3- and 1,4-bis[N-(4-fluorophthalimido)]benzene, and 4,4'-bis[N-(4-fluorophthalimido)]phenyl ether and the corresponding chloro, bromo and nitro compounds.

6. A method according to claim 4 wherein the dihydroxy-substituted aromatic hydrocarbon has the formula $$HO-A^2-OH, \qquad (II)$$

wherein $A^2$ is a divalent aromatic hydrocarbon radical of the formula $$-A^3-Y-A^4-, \qquad (III)$$

wherein each of $A^3$ and $A^4$ is a monocyclic divalent aromatic hydrocarbon radical and Y is a bridging radical in which one or two atoms separate $A^3$ from $A^4$ and the free valence bonds in formula III are in the meta or para positions of $A^3$ and $A^4$ in relation to Y.

7. A method according to claim 6 wherein the dihydroxy-substituted aromatic hydrocarbon is bisphenol A.

8. A method according to claim 7 wherein the alkali metal salt is a sodium salt.

9. A method according to claim 4 wherein there is also present a solvent and a phase transfer catalyst which is substantially stable at temperatures in the range of about 125–250° C.

10. A method according to claim 9 wherein the solvent is a halogenated aromatic compound or an alkoxybenzene.

11. A method according to claim 10 wherein the solvent is o-dichlorobenzene.

12. A method according to claim 10 wherein the solvent is anisole.

13. A method according to claim 9 wherein the phase transfer catalyst is a quaternary phosphonium salt, N-alkyl-4-dialkylaminopyridinium salt or guanidinium salt.

14. A method according to claim 13 wherein the phase transfer catalyst is a hexaalkylguanidinium salt.

15. A method according to claim 14 wherein the hexaalkylguanidinium salt is hexaethylguanidinium chloride.

16. A method according to claim 4 wherein the temperature is in the range of about 125–250° C.

17. A method according to claim 4 wherein the proportion of phase transfer catalyst employed is about 0.5–10 mole percent based on alkali metal salt.

18. A method according to claim 4 wherein the intermediate polymer has a weight average molecular weight, as determined by gel permeation chromatography, in the range of about 10,000–40,000.

19. A method according to claim 4 wherein about 95–99.5 mole percent of the stoichiometric amount of alkali metal salt is employed in step A and the remaining amount, about 0.5–5.0 mole percent, in step C.

20. A method for preparing a desired polyetherimide having a predetermined molecular weight which comprises:

(A) contacting, at a temperature in the range of about 125–250° C., bisphenol A disodium salt with at least one member selected from the group consisting of 1,3- and 1,4-bis[N-(4-chlorophthalimido)]benzene in o-dichlorobenzene or anisole as solvent and in the presence of a hexaalkylguanidinium salt as phase transfer catalyst, the proportion of said disodium salt being about 95–99.5 mole percent of the total amount calculated to produce said desired polyetherimide, thereby producing an intermediate low molecular weight polyetherimide;

(B) determining the molecular weight of said intermediate polyetherimide; and
(C) adding a further portion of said disodium salt, said further portion being calculated to produce said desired polyetherimide and being in the range of between about 0.5 and about 5.0 mole percent of total disodium salt, and continuing said condensation reaction to produce said desired polyetherimide.

21. A method according to claim 20 wherein the hexaalkylguanidinium salt is hexaethylguanidinium chloride.

* * * * *